US010472126B2

(12) United States Patent
Arnaud et al.

(10) Patent No.: US 10,472,126 B2
(45) Date of Patent: Nov. 12, 2019

(54) COLLAPSIBLE METAL BOX (71) Applicant: Groupe Arnaud, Prechac (FR)

(72) Inventors: Benoît Arnaud, Bruges (FR);
Jean-François Baus, Le Bouscat (FR);
Jean-Laurent Bodolec, Podensac (FR);
Vincent Marly, Totton Hampshire (GB)

(73) Assignee: GROUPE ARNAUD, Prechac (FR)

( * ) Notice: Subject to any disclaimer, the term of this patent is extended or adjusted under 35 U.S.C. 154(b) by 311 days.

(21) Appl. No.: 14/424,126

(22) PCT Filed: Aug. 26, 2013

(86) PCT No.: PCT/IB2013/056884
§ 371 (c)(1),
(2) Date: Feb. 26, 2015

(87) PCT Pub. No.: WO2014/033608
PCT Pub. Date: Mar. 6, 2014

(65) Prior Publication Data
US 2015/0239604 A1  Aug. 27, 2015

(30) Foreign Application Priority Data

Aug. 27, 2012  (FR) ..................................... 12 58005

(51) Int. Cl.
*B65D 25/04* (2006.01)
*B65D 6/26* (2006.01)
(Continued)

(52) U.S. Cl.
CPC ................. *B65D 7/30* (2013.01); *B65D 7/06* (2013.01); *B65D 19/12* (2013.01); *B65D 25/24* (2013.01);
(Continued)

(58) Field of Classification Search
CPC . B65D 7/30; B65D 7/06; B65D 19/12; B65D 25/24; B65D 2519/00024;
(Continued)

(56) References Cited

U.S. PATENT DOCUMENTS 3,635,368 A    1/1972  Winsor
4,186,841 A *  2/1980  Buckley ................. B65D 19/12
                                                            206/511
(Continued)

FOREIGN PATENT DOCUMENTS

DE    9012097    * 10/1990 ............. B65D 88/52
EP    1633641 B1    4/2008
(Continued)

OTHER PUBLICATIONS

International Search Report for PCT/IB2013/056884 dated Mar. 26, 2014.

*Primary Examiner* — Andrew T Kirsch
*Assistant Examiner* — Elizabeth J Volz
(74) *Attorney, Agent, or Firm* — Cooper Legal Group, LLC; Ronald M. Kachmarik (57) ABSTRACT

A collapsible metal box, in particular for transporting a material sensitive to creep, is provided. The box includes a base and two first and two second opposing side panels hinged to the base. At least one of the first side panels includes a retaining structure for maintaining the same in an upright position on the base while the second side panels are collapsed fully outwards.

16 Claims, 4 Drawing Sheets

(51) Int. Cl.
*B65D 19/12* (2006.01)
*B65D 6/02* (2006.01)
*B65D 25/24* (2006.01)
*B65G 65/30* (2006.01)

(52) U.S. Cl.
CPC ........ *B65G 65/30* (2013.01); *B65D 2519/009* (2013.01); *B65D 2519/00024* (2013.01); *B65D 2519/00059* (2013.01); *B65D 2519/0096* (2013.01); *B65D 2519/00164* (2013.01); *B65D 2519/00273* (2013.01); *B65D 2519/00502* (2013.01); *B65D 2519/00611* (2013.01); *B65D 2519/00656* (2013.01); *B65D 2519/00805* (2013.01); *B65D 2519/00975* (2013.01)

(58) Field of Classification Search
CPC ........... B65D 2519/00059; B65D 2519/00164; B65D 2519/00273; B65D 2519/00502; B65D 2519/00611; B65D 2519/00656; B65D 2519/00805; B65D 2519/009; B65D 2519/0096; B65D 2519/00875; B65D 19/16; B65D 2519/00687; B65D 2519/00582; B65G 65/30
USPC ................ 220/6, 7, 4.28, 666; 206/577, 600
See application file for complete search history.

(56) References Cited

U.S. PATENT DOCUMENTS

2006/0226143 A1\* 10/2006 Elstone .................. B65D 19/12
    220/6
2011/0139803 A1\* 6/2011 Leslie ................ A47G 23/0216
    220/739

FOREIGN PATENT DOCUMENTS

| | | | |
|---|---|---|---|
| FR | 2653094 | A1 | 4/1991 |
| GB | 2445878 | A | 7/2008 |
| WO | 2004108542 | A1 | 12/2004 |

\* cited by examiner

COLLAPSIBLE METAL BOX

The present invention relates to a collapsible metal box, in particular for transporting a material that is susceptible to creep, for example synthetic rubber formed into bales, and also to a method for emptying a box according to the invention.

Boxes that are suitable in particular for transporting creep-capable materials such as rubber are known for example from the application FR 2 653 094, which discloses stackable boxes.

The patent GB 2 445 878 and the Applicant's patent EP 1 633 641 disclose a box comprising collapsible sides which may be locked reversibly during the assembly of the box.

A collapsible box is understood to be a box of which the panels may be flapped inward or outward.

In the present application, the terms vertical/horizontal, upper/lower, top/bottom, above/below, external/internal and other orientation terms should be understood in relation to an observer located in front of the box, which is positioned the right way up on a horizontal flat surface.

It is difficult to completely empty existing boxes, since the transported material tends, during transport, to mold itself as closely as possible to the internal shape of the walls of the box, in particular to the bottom of the box. It is frequently necessary to remove the side walls in order to be able to empty the lower layers, which otherwise remain wedged in place.

There is a need to reinforce existing collapsible metal boxes.

There is also a need to benefit from a multiple use collapsible metal box and to make it possible to best use the internal volume of a collapsible metal box during the filling thereof.

There is also a need to benefit from a collapsible metal box that makes it possible to fold the side panels in and out in a simple and rapid manner during the use of the box.

There is also a need to make it easier to carry out operations of handling and of filling and emptying these boxes.

There is also a need to benefit from a collapsible metal box that makes it possible to best use the available space in sea containers.

The invention aims to meet all or part of the abovementioned needs.

According to a first aspect, the subject of the invention is a collapsible metal box, in particular for transporting a material that is susceptible to creep, comprising a base, two first and two second opposing side panels that are articulated to the base, at least one of the first side panels comprising holding means for holding it in a position standing by itself on the base while the second side panels are folded out fully toward the outside.

This position is particularly advantageous during the emptying of the box. It is not necessary to remove one or more side panels in order to completely empty the box. Access to the goods transported, including for the lower layers, is made easier by virtue of the second side panels that are folded out fully toward the outside.

Both first side panels may comprise holding means for holding them in a position standing by themselves on the base while the second side panels are folded out fully toward the outside.

The box may comprise at least one system for locking at least two adjacent articulated panels.

Preferably, the four side panels may be locked in position when the box is assembled.

The articulated panels may be flapped toward the inside or toward the outside.

Each first panel is able for example to move between a position folded in toward the inside of the box and the position standing by itself.

Each of the second side panels may be able to move between a position in which it is folded out fully toward the outside and a position in which it is folded in toward the inside of the box.

The expression "folded out fully" toward the outside should be understood as meaning that the panels are at least folded out toward the outside as far as the horizontal, or as far as the ground.

The holding means may be designed to hold one of the first side panels in the position standing by itself while the second side panels are being moved between the position in which they are folded out fully toward the outside and a position in which they are folded in toward the inside, and vice versa.

Holding Means

In the position standing by itself, the first side panel may be approximately vertical.

The holding means of the first panel may comprise a joining element of which the lower part is temporarily inserted into the upper end of a corner upright of the base in order to hold the corresponding first side panel in the position standing by itself, and of which the upper part is inserted into an opening at the lower end of a side upright of the first panel.

The upper part of the joining element may be fixed to the interior of the side upright by any suitable means, in particular by welding and/or with the aid of a fixing pin.

The joining element may be solid or hollow.

The joining element may be made of metal, for example by machining, molding, casting molten metal or forging. The edges of the joining element may be rounded, in particular when the joining element is produced by casting molten metal or forging.

The joining element may limit the pivoting of the first panel toward the outside, in other words the joining element may limit the opening angle α of the first panel, said angle being defined between a horizontal position of the first panel folded in toward the inside and the position standing by itself.

In exemplary embodiments, when it holds itself in a position standing by itself, a first side panel may be at an opening angle α of strictly greater than 90°, in particular between 90° and 120°, in particular greater than or equal to 95°.

Preferably one, or both, first side panels do not have any mechanical blocking element able to prevent said panel folding in toward the inside of the box from the assembled position or the standing position.

Compared with known boxes, this makes it possible to eliminate the need to lift the panels or even to remove them m order to be able to fold them in. Handling of the box is thus simplified.

The corner upright may comprise, for example, an indentation on an internal face adjacent to a second panel when the box is assembled, said indentation making it possible to tilt the first panel with the joining element still inserted into the lower part of the side upright of the first panel.

In the standing position of the side panel, the lower part of the joining element bears against the internal wall of the corner upright located in line with the side upright. When the first panel is folded in toward the inside, the lower part of the joining element moves away from the internal wall of the corner upright and is positioned, as the first panel tilts toward the inside, in the indentation in the corner upright.

Reinforcing Means

In a known manner, the side panels and the base may each comprise a metal framework and plates, also metal, fixed to the metal framework.

The metal framework, for example made of steel or aluminum, may comprise, besides vertical side uprights and lower and upper horizontal cross members, vertical reinforcements between the lower and upper cross members.

The base may furthermore comprise a plurality of retaining cleats which are disposed on at least one of its sides and are arranged such that the corresponding side panels may bear against them, in particular when the pressure of the goods inside the box is high.

The retaining cleats are for example in accordance with those described in the application WO 2004/108542.

The base may comprise one or more retaining cleats on each of its sides.

It is possible for the base not to comprise any cleats on at least one of its sides.

The presence or absence of cleats, the number thereof and positioning thereof do not limit the invention.

The box may comprise additional means for reinforcing the side panels and the base.

The pressure exerted when the box is filled is particularly high at the bottom of the box, in particular in the region of the corners. While existing vertical reinforcing means in conventional boxes are distributed across the width of the side panels, the box may comprise additional reinforcing means, in particular designed to reinforce the corners at the bottom of the box.

The additional reinforcing means may be located on the first side panels so as not to hinder the movement of the second panels between the position folded out fully toward the outside and the position folded in toward the inside, and vice versa.

A first side panel may comprise for example an additional vertical tubular reinforcement, in particular adjacent to a vertical reinforcement of the first panel.

In a preferred embodiment, a first side panel comprises at least one tubular vertical corner reinforcement, in particular attached to a side upright of the first panel.

It is possible for the tubular corner reinforcement not to extend up to the top of the upright, in particular not to extend up to the level of the locking system.

The tubular reinforcement of the first panel may have a rectangular or square section.

It may extend down as far as the level of the lower horizontal cross member of the first panel.

The presence of at least one tubular reinforcement is particularly advantageous when the side panel does not comprise any retaining cleats.

Compared with a retaining cleat as known from the prior art, a tubular corner reinforcement of the first panel has the advantage of also making it easier to hold the first panel in a position standing by itself. In particular when the first side panel standing by itself is at an opening angle of strictly greater than 90°, the corner reinforcement partially compensates the forces that tend to open the first panel and to fold it out toward the outside.

In one example of a box according to the invention, it is possible for the first panels not to be folded out fully toward the outside.

The box may comprise an angle bracket secured to a first side panel and able to laterally reinforce the adjacent second side panel.

The angle bracket may comprise a profiled element, particular in the shape of an "L".

The angle bracket may be designed to cover, at least in part, two sides of the side upright of the adjacent second side panel when the adjacent first and second side panels are assembled and locked. The angle bracket thus reinforces the second panel of which the side upright remains more easily attached to the lateral upright of the first panel.

The angle bracket may be secured to a side upright of the first side panel. The angle bracket may start at the top of the side upright of the first panel. It may extend down to the bottom of the side upright of the first panel.

In one variant, the angle bracket is interrupted and does not extend down to the bottom of the side upright of the first panel.

In one exemplary embodiment, the angle bracket ends with a beveled shape directed toward the bottom of the upright of the first panel.

An angle bracket that does not extend down to the bottom of the side upright of the first panel and/or is ended by a bevel directed toward the bottom of the upright of the first panel does not impede the movement of the second side panels and makes it easier to handle the box.

The angle bracket thus secured to the upright of a first panel reinforces a second panel on the side when the box is assembled.

The upright is manufactured for example with the angle bracket or the latter may be produced with the aid of an attached element.

The reinforcing means of the base may be formed by folding a metal sheet and/or by way of an attached element.

The base may comprise metal plates fixed to a framework, also metal, comprising reinforcing means.

The reinforcing means of the base may be disposed transversely and/or diagonally.

The plates and the reinforcing means may form the bottom of the box.

The transverse reinforcements are for example tubular, having various cross sections, for example square, rectangular, semicircular, circular, this list not being limiting.

The diagonal reinforcements are for example formed by a profiled element, for example having a cross section in the shape of a U, in the shape of an $\Omega$ etc.

The presence of transverse reinforcements makes it possible to have relatively short diagonal reinforcements that are thus less susceptible to flexion and more effective at maintaining the rigidity of the base of the box. The maximum thickness of the bottom of the box may thus be reduced compared with that of boxes that are generally used, without any risk of additional deformation, thereby making it possible to increase the load inside a box.

The bottom has for example a maximum thickness less than or equal to 15 mm.

In one particular variant, the base has an approximately rectangular overall shape and the two first side panels correspond for example to the long sides of the base and the two second side panels to the short sides. Alternatively, the two first side panels may correspond to the short sides of the base and the two second side panels to the long sides, without departing from the scope of the present invention. In one variant, the box comprises four panels with similar widths, being for example approximately cubic.

Feet

The box may comprise feet, in particular one foot at each corner of the base.

Each foot may comprise two recesses, in particular two recesses that are generally perpendicular to one another, for example as described in the application WO 2004/108542.

The feet may each comprise a horizontal lower base plate, in particular having an elongate shape along an axis parallel to the first side panels, comprising two approximately perpendicular sides that are connected to the recesses.

Conventionally, in order to stack the boxes, in the empty or filled state, use is made of a forklift truck or a hand-operated pallet truck. On the other hand, in order to transport boxes, before or after operations of loading and/or unloading the container, it may be advantageous to use a roller conveyor. The elongate shape of the base plates is particularly advantageous for transport by way of a roller conveyor; the boxes transported are more stable than with base plates of which the sides are substantially the same.

In one preferred exemplary embodiment of the invention, the dimensions of the box are chosen such that it is possible to stack nine boxes in the folded-in state or two boxes in the folded-out state in a sea container, of standard dimensions, and such that two boxes can be side by side in this container.

According to another of its aspects, the subject of the invention is a joining element designed to hold a first side panel of a box as defined above in a position standing by itself.

According to yet another aspect, the subject of the invention is a method for emptying a box as defined above which is filled with a material, in particular a material that is susceptible to creep, wherein emptying is carried out, at least in part, while at least one of the first side panels is in a position standing by itself and the second side panels are folded out fully toward the outside.

The emptying is carried out, for example, at least in part, while the two first side panels maintain by themselves a position mounted on the base and the two second side panels are folded out toward the outside.

In order to be able to fold out the second panels while the box is assembled, in particular for transport, and contains for example bales of a material, it is sufficient to unlock the side panels.

The second panels are folded out toward the outside preferably when the two first panels are standing. The box may then be emptied easily.

According to one example of the method according to the invention, once the box has been emptied, the second side panels are moved between the position folded out fully toward the outside and the position folded in toward the inside while the first side panels hold themselves in the position standing by themselves.

Each first side panel may then be folded in toward the inside without having to lift or remove said panel.

In one particular embodiment, a joining element comprises an upper part inserted in particular in a non-removable manner into the lower part of a side upright of a first panel.

The invention may be better understood from reading the following detailed description of a nonlimiting exemplary embodiment thereof, and from examining the appended drawing, in which:

FIG. 5A shows a schematic bottom view of the base of the box from FIG. 1, FIG. 5B shows the detail $V_B$ from FIG. 5A in section, FIG. 6 shows a perspective bottom view of a foot of the box from FIG. 1, FIG. 7 shows a box according to the invention as it is being transported by a roller conveyor, FIG. 8 shows a schematic front view of two boxes stacked in the assembled state, FIG. 9 shows a schematic perspective view of two stacked boxes in the folded-in state, and FIG. 10 shows a peg that can be used in an example of the invention, on its own.

Figure 1:
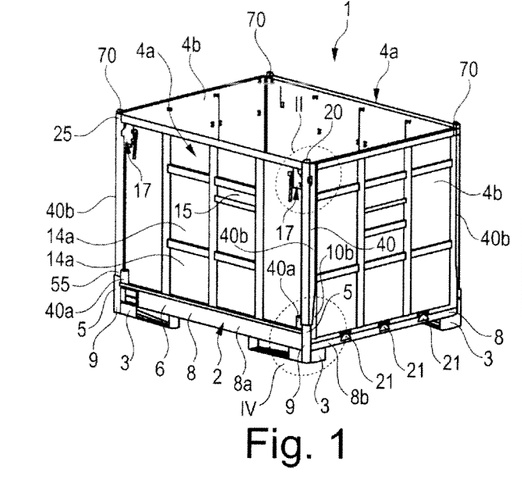
FIG. 1 shows a schematic perspective view of a box in accordance with the invention.

FIG. 1 shows an example of a collapsible box 1, made of steel, in the assembled state, comprising a base 2 that rests on four feet 3 and comprising two first side panels 4a and two second side panels 4b that are opposite one another in pairs.

In the example illustrated, the four panels are removable relative to the base 2 and articulated to the base 2 about horizontal geometric rotation axes. Each panel comprises, in the example illustrated, articulation elements such as those described in the application WO 2004/108542.

Figure 3A:
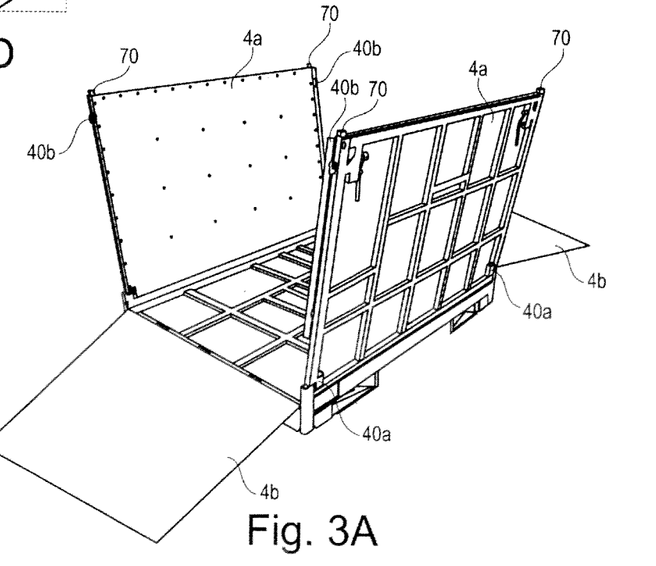
FIG. 3A is a schematic perspective view of the box from FIG. 1, the two first side panels being in a standing position and the two second side panels being flapped fully toward the outside, as far as the ground.

The first and the second articulated panels 4a and 4b may thus be flapped toward the inside of the box into a fully folded-in position. The second panels 4b may also be flapped toward the outside of the box, as illustrated for example in FIG. 3. The geometric articulation axes of the panels are located at different heights, so as to allow the panels to be flapped onto one another when the box is folded in.

Locking systems 17 are provided to hold the panels 4 together and vertical when the box is assembled. Each locking system 17 may be for example as described in the application WO 2004/108542.

Figure 2A:
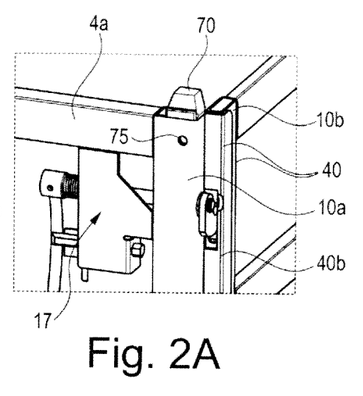
FIGS. 2A and 2B illustrate a perspective view and a top view of the detail II from FIG. 1.

FIG. 2A shows the locking systems 17 when the box is assembled.

The side panels 4a and 4b each comprise a metal framework, made of steel in the example in question, comprising vertical side uprights 10a and 10b and lower horizontal cross members 12a-12b and upper horizontal cross members 11a and 11b, which consist of metal profiled elements made of galvanized steel in the example illustrated.

The metal framework also comprises vertical reinforcements 13a and 13b which link the cross members 11a and 12a, and 11b and 12b, respectively. Plates made of galvanized steel 14a and b are fixed to the metal framework.

The base 2 comprises two cleats 21 on its second sides 8b and does not comprise any cleats on the first sides 8a.

Each side upright 10a of the first side panels 4a extends in line with a corner upright 5 of the base 2, when the box is in a locked position as illustrated in FIG. 1. The corner uprights 5 consist, in the example illustrated, of hollow and vertical profiled elements having an approximately rectangular section. The corner uprights 5 are connected, at the sides 8 of the base 2, by horizontal cross members 6.

The lower part 50a of a joining element 50 is inserted into the upper end of a corner upright 5 of the base 2. The upper part 50*b* of the joining element 50 is inserted into an opening at the lower end of the side upright 10*a* of the first panel 4*a* in order to hold it in a standing position.

Preferably, the upper part 50*b* of the joining element 50 remains inserted in the end of the side upright 10*a* of a first panel during the handling of the box, in particular during assembly and folding operations.

Optionally, the joining element 50 may be fixed with the aid of a pin inserted and welded into the bore 55 in the side upright 10.

Figure 2B:
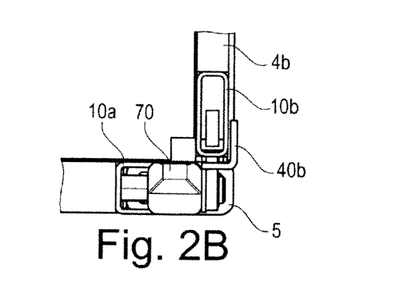

Angle brackets 40*b* that are formed for example by a profiled element n the shape of an "L" are secured to the uprights 10*a* of the first panels 4*a*. It can be seen in FIG. 2 that the angle bracket 40*b* covers two sides of the side upright 10*b* of the second panel 4*b*. The angle brackets 40*b* reinforce the sides of the second panels 4*b* when the box is assembled, as illustrated in FIG. 1.

Figure 3B:
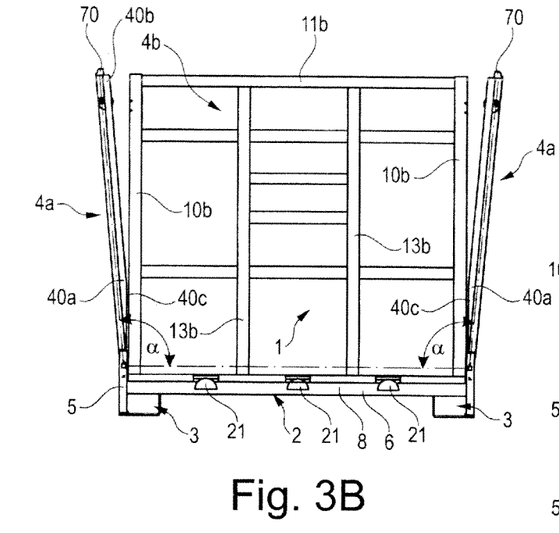
FIGS. 3B and 3C are front views of the box from FIG. 1, the two first side panels being in a standing position before and, respectively, during the flapping of the visible second side panel toward the outside.
Figure 3C:
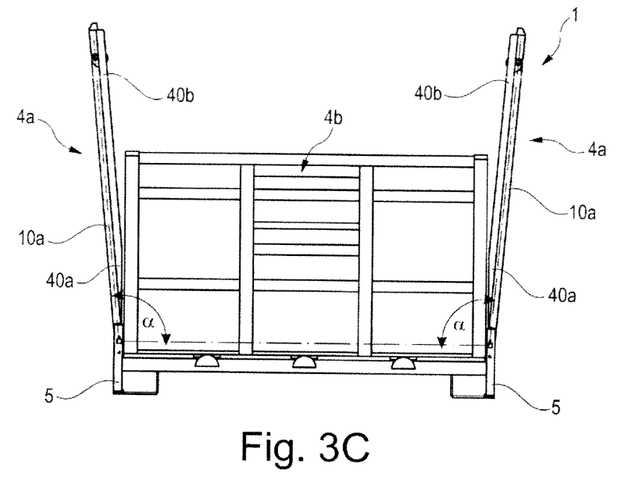

The angle brackets 40*b* in the example illustrated start from the top of the uprights 10*a* and end with a beveled shape 40*a* at the bottom of said upright. When the first side panel 4*a* holds itself in a position standing by itself, the beveled shape 40*a* of the angle bracket 40*b* may have a vertical outside edge 40*c*, as illustrated in FIG. 3B.

In the example illustrated, each side upright 10*a* of a first panel 4*a* is topped with a peg 70 inserted downwardly into the upper part of the profiled element that forms the side upright 10*a* in question. Optionally, the peg 70 may comprise a bore 72 and be fixed with the aid of a pin that is inserted and welded into the bore 72 and a bore 75 in the side upright 10*a*.

The peg 70 may be solid or hollow.

The peg 70 may be made of metal, for example by molding, casting molten metal or forging. The edges of the peg 70 may be rounded, in particular when the peg is produced by casting molten metal or forging.

While FIG. 1 shows the four side panels locked in the vertical position, in FIG. 3A the two first side panels maintain an approximately vertical position standing by themselves and the two second side panels are flapped fully toward the outside until they touch the ground or the surface on which the box is placed.

When it is in this position, in which it is standing and not locked, the first side panel 4*a* is at an opening angle α greater than 95°, said angle α being measured between a horizontal position folded toward the inside and the free, assembled standing position, that is to say in which it is neither locked nor held. More generally, the opening angle may be between 90° and 120°.

This opening beyond the vertical favors the stability of this position of the first side panel and also makes it possible to move the second side panels between the position folded out toward the outside, shown in FIG. 3A, and a vertical non-locked position illustrated in FIG. 3B and a position folded toward the inside and, while keeping the first side panels 4*a* standing.

This is particularly advantageous for the unloading of the boxes, which may be carried out with the side panels in the position in FIG. 3A. It is, in particular, much easier to reach the lower layer of goods, for example hales of rubber, when the second panels are thus folded out toward the outside, the first panels being in a standing position.

FIG. 3B shows that the beveled shape of the angle brackets 40*b* makes it possible to pivot the second panels in an unhindered manner while the first panels maintain a position standing by themselves and forming an angle α of strictly greater than 90°, equal to 95° in the example illustrated, with the horizontal position, folded toward the inside of the box.

Figure 4A:
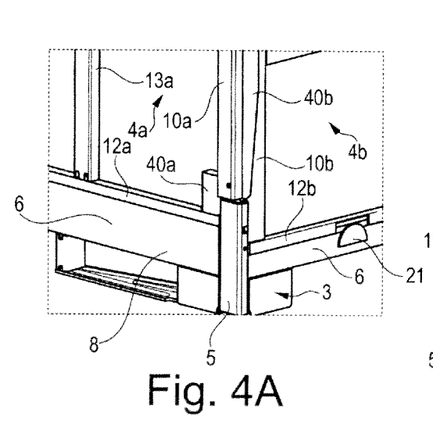
FIGS. 4A to 4F show different views of the detail IV from FIG. 1, FIGS. 4G and 4H show a side view and a perspective view of a joining element that can be used in an example of the invention, on its own.
Figure 4B:
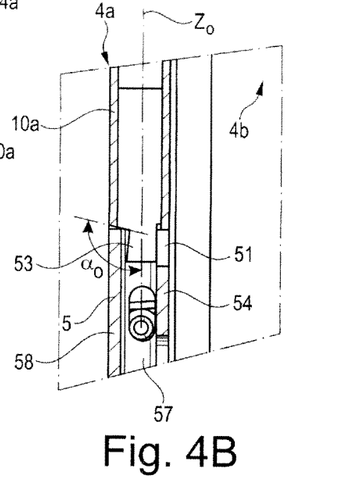
Figure 4C:
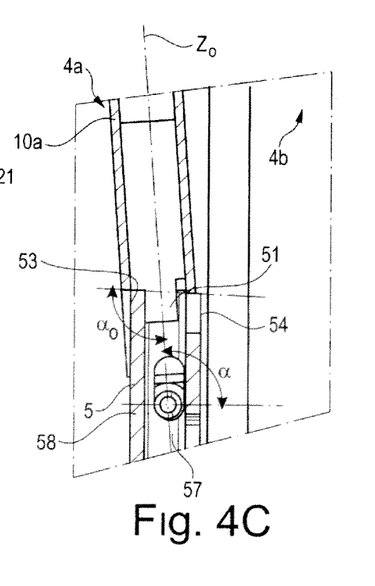
Figure 4D:
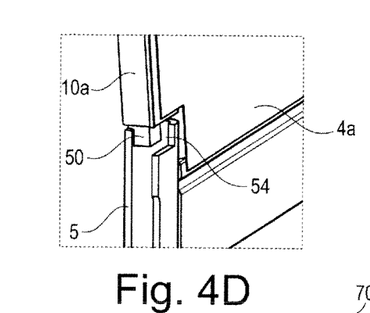
Figure 4E:
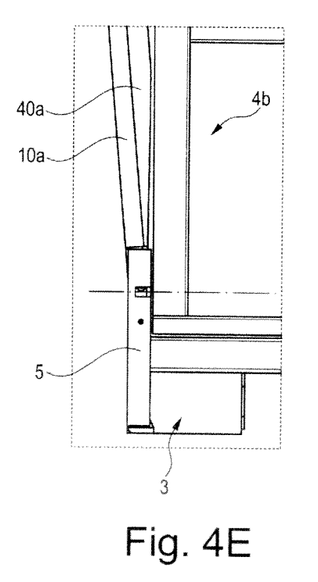
Figure 4F:
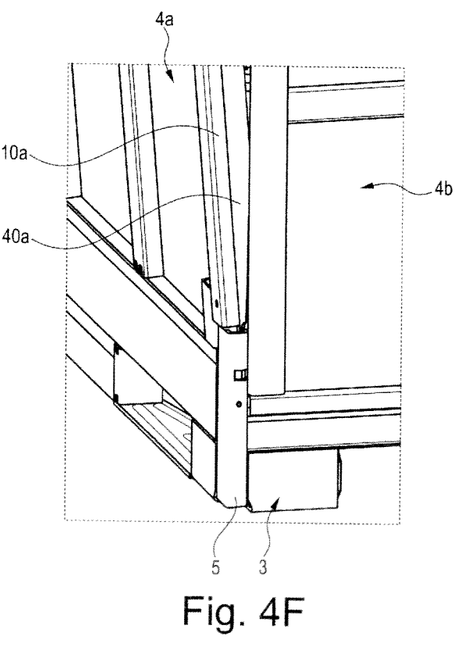

While FIG. 4A illustrates a perspective view of the detail IV from FIG. 1, FIGS. 4B and 4C show partial sections through the side upright 10*a* of the first panel 4*a* and through the corner upright 5 between which the joining element 50 is positioned. In the partial section in FIG. 4D, only the corner upright 5 is in section.

The joining element 50 illustrated comprises an upper part 50*b* having a section that is approximately square, for example, and a lower part 50*a*.

Figures 4G, 4H, 5A, 5B, 6, 7, 8, 9, 10:
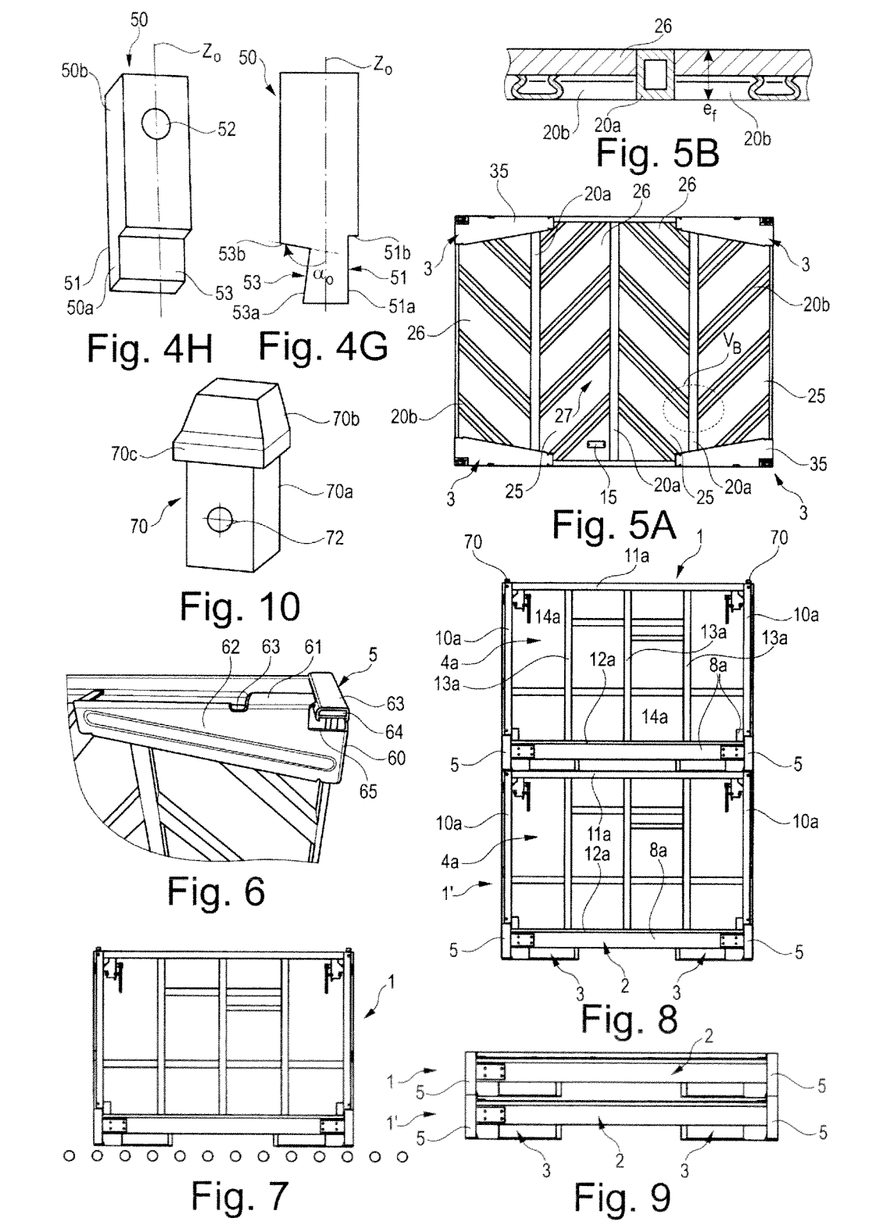

The lower part 50*a* of the joining element 50 may comprise two recesses 51 and 53, as illustrated in FIGS. 4G and 4H.

The first recess 51 may form, as in the example illustrated, two perpendicular flat sides, a long side 51*a* parallel to the longitudinal axis $Z_0$ of the joining element and a short side 51*b* perpendicular thereto.

The first recess 51 makes it possible to prevent mechanical blocking that may impede the folding of the first panel toward the inside of the box.

The second recess 53 may form, as in the example illustrated, two flat sides, a short side 53*b* and a long side 53*a* perpendicular thereto.

The short side 53*b* may be such that it defines an angle $\alpha_0$ of strictly greater than 90°, in particular equal to 95°, with the longitudinal axis $Z_0$ of the joining element.

The angle $\alpha_0$ limits the pivoting of the corner upright and corresponds to a maximum opening angle of the first panel when the latter holds itself in the position standing by itself.

The angle $\alpha_0$ may be between 90° and 120°.

In the assembled position of the box 1 with the side panels 4 locked, the joining element 50 is in line with the side upright 10*a* as illustrated in FIG. 4B.

In the position of the side panel standing by itself, as illustrated in FIG. 4C, the lower part 50*a* of the joining element 50, in particular the recess 53, bears against the external wall 58 of the corner upright 5 that is in line with the side upright 10*a*.

The corner upright 5 also comprises an indentation 54, designed to make it easier for the joining element 50 fixed in the side upright 10*a* to pass when the first panel 4*a* is moved in order to be folded in toward the inside of the box.

The joining element 50 illustrated is produced by casting molten metal; in its upper part 50*b*, it comprises a bore 52 designed to receive a fixing pin for keeping the joining element inside the side upright 10*a* during handling operations of the box, be it assembled or folded in, empty or full.

At least one label holder 15 may also be fixed to at least one panel 4, as illustrated in FIG. 1, or under the base 2, as shown in FIG. 5.

The base 2 of the box illustrated has a rectangular overall shape, the first panels, corresponding to the long sides of the base, have for example a maximum thickness $e_a$ of around 30 mm, while the second panels 4*b*, corresponding to the short sides, have for example a maximum thickness $e_b$ of around 20 mm.

The base 2 comprises a bottom 27. Transverse reinforcing means 20*a* formed by profiled elements divide the bottom into four parts 25, each corresponding to a metal plate 26. Preferably, the parts 25 have identical dimensions, but if there are a different number of parts 25 or parts 25 that are not the same, this does not depart from the scope of the invention.

Between these transverse reinforcements 20a, the bottom 27 comprises diagonal reinforcements 20b. The plates 26 are welded to the transverse reinforcements 20a and to the diagonal reinforcements 20b.

As illustrated in FIG. 5B, in this embodiment, the transverse reinforcements 20a are tubular reinforcements having a rectangular section and the diagonal reinforcements 20b consist of profiled elements made of steel with a cross section in the form of an Ω.

The combination of transverse reinforcements and diagonal reinforcements makes it possible to have a strong box with a relatively small maximum thickness $e_f$ of the bottom of the box compared with that of prior art boxes. The maximum thickness of the bottom is measured in cross section as illustrated in FIG. 5B. In the example in question, the bottom has a maximum thickness $e_f$ equal to 15 mm. The bottoms of known boxes frequently have thicknesses in the region of 30 mm.

FIG. 6 shows that each foot 3 comprises a base plate 62 having an elongate shape along an axis parallel to the first side panels. Each base plate may have the overall shape of a right-angled triangle or of a right-angled trapezium, as illustrated.

A foot 3 has been shown in a bottom view in FIG. 6. It comprises two approximately perpendicular sides 60 and 61. A base plate 62 connects the sides 60 and 61.

The base plate 62 comprises at least one opening 63, two in the example illustrated, allowing a liquid to flow out, in particular during the step of galvanizing the steel of which the box is made.

The corner upright 5 comprises a notch 65 in its lower part, this notch 65 being formed laterally toward the inside of the box in the example illustrated.

The notch 65 may be designed to receive, at least partially, the upper part of a peg 70 during the stacking of boxes, as explained below.

The corner upright 5 is offset with respect to the base plate 62, thereby preventing it from resting on the ground and also allowing a degree of locking of an underlying box when two boxes are stacked in the folded-instate, the upper end of a corner upright 5 of the underlying box being positioned in the offset.

While, the overall shape of a right-angled isosceles triangle of the base plates of the feet of known boxes renders transport by roller conveyer relatively unstable, in the example illustrated, the elongate shape of the base plate allows the foot to always rest on at least two rollers during transport by roller conveyer, as shown in FIG. 7, thereby rendering the transported box more stable and thus this mode of transport more reliable.

FIGS. 8 and 9 show two stacked boxes 1 and 1', in the assembled state and the folded-instate, respectively.

FIG. 8 shows pegs 70 inserted into the upper end of the side uprights 10a of the first panels 4a.

As can be seen in FIG. 10, each peg 70 may comprise an upper part 70b having a semi-pyramidal shape which forms a recess with respect to a support 70c having an approximately square shape, and a lower part 70a designed to be inserted into the top of a side upright 10a of a first panel 4a. If the shape of the peg 70 is different, for example, this does not depart from the scope of the present invention.

In the assembled state, as in FIG. 8, the upper parts 70b, having a semi-pyramidal shape, of the pegs 70 of the lower box 1' are inserted into the notches 65 of the corner uprights 5 of the upper box 1.

Of course, the invention is not limited to the exemplary embodiments which have just been described, and it is possible in particular to modify the relative dimensions of the panels and of the base.

The expression "comprising a" should be understood as being synonymous with "comprising at least one".

The invention claimed is:

1. A collapsible metal box, comprising:
   a. a base,
   b. two first and two second opposing side panels that are articulated to the base about horizontal geometric rotation axes, at least one of the first side panels comprising holding means for holding it in a position standing by itself on the base while the second side panels are folded out fully toward the outside, wherein the holding means comprise a joining element of which
      i. a lower part is temporarily inserted into the upper end of a corner upright of the base in order to hold the corresponding first side panel in the position standing by itself, and
      ii. an upper part is inserted into an opening at the lower end of a side upright of the first panel,
   wherein at least one of the first side panels, when it is held in the position standing by itself, is at an opening angle α, of greater than or equal to 95°, said angle being measured between a horizontal position of the first panel folded in toward the inside and the position standing by itself, the lower part of the joining element comprising a recess forming two flat sides, with one short side and one long side perpendicular thereto, the short side defining an angle of greater than 95° with the longitudinal axis of the joining element, the angle limiting the pivoting of the corner upright and corresponding to a maximum opening angle of the first panel when the latter holds itself in the position standing by itself.

2. The box as claimed in claim 1, wherein the holding means are designed to hold at least one of the first side panels in the position standing by itself, independently of the movement of the second side panels between the position in which they are folded out fully toward the outside and a position in which they are folded in toward the inside, and of the movement in the opposite direction.

3. The box as claimed in claim 1, wherein the upper part of the holding means is fixed in the opening at the lower end of the side upright of the first panel.

4. The box as claimed in claim 1, wherein the holding means are designed to allow the corresponding first side panel to be folded in, without having to be lifted or removed, between the standing position and a position in which it is folded in toward the inside.

5. The box as claimed in claim 1, comprising an angle bracket secured to a first side panel and able to laterally reinforce the adjacent second side panel,
   the angle bracket comprising a profiled element secured to a side upright of the first side panel and designed to cover, at least in part, two sides of the side upright of the adjacent second side panel when the adjacent first and second side panels are assembled and locked,
   the angle bracket being interrupted at the bottom of the upright and/or ending with a beveled shape inclined toward the bottom of the upright,
   the angle bracket starting in particular at the top of the upright.

6. The box according to claim 5, wherein the profiled element is in the shape of an "L".

7. The box as claimed in claim 1, wherein the base has a maximum thickness $e_b$ less than or equal to 15 mm.

8. The box as claimed in claim 1, comprising feet, one foot at each corner of the base.

9. The box as claimed in the claim 8, wherein the feet each comprise a base plate having an elongate shape along an axis parallel to the first side panels.

10. The box as claimed in claim 1, wherein the base has an approximately rectangular shape, the two first and second side panels corresponding respectively to the long sides and to the short sides of the base.

11. A method for emptying a box as claimed in claim 1 which is filled with a material,
wherein emptying is carried out, at least in part, while at least one of the first side panels is in a position standing by itself and the second side panels are folded out fully toward the outside.

12. The method according to claim 11, wherein the material filling the box is susceptible to creep.

13. The box according to claim 1, wherein a material transported in the box is of the type susceptible to creep.

14. The box according to claim 1, wherein the opening angle α is between 95° and 120°.

15. A collapsible metal box, comprising:
a. a base,
b. two first and two second opposing side panels that are articulated to the base, at least one of the first side panels comprising holding means for holding it in a position standing by itself on the base while the second side panels are folded out fully toward the outside,
c. an angle bracket secured to a first side panel and able to laterally reinforce the adjacent second side panel, the angle bracket comprising a profiled element secured to a side upright of the first side panel and designed to cover, at least in part, two sides of the side upright of the adjacent second side panel when the adjacent first and second side panels are assembled and locked, the angle bracket being interrupted at the bottom of the upright and/or ending with a beveled shape inclined toward the bottom of the upright, the angle bracket starting at the top of the upright.

16. The box of claim 15, wherein the profiled element is in the shape of an "L".

* * * * *

UNITED STATES PATENT AND TRADEMARK OFFICE
CERTIFICATE OF CORRECTION

PATENT NO. : 10,472,126 B2
APPLICATION NO. : 14/424126
DATED : November 12, 2019
INVENTOR(S) : Benoît Arnaud et al.

Page 1 of 1

It is certified that error appears in the above-identified patent and that said Letters Patent is hereby corrected as shown below:

In the Specification

Column 2, Line 56: Delete the word "m" and insert therefore the word --in--

Column 7, Line 61: Delete the word "hales" and insert therefore the word --bales--

Signed and Sealed this
Tenth Day of March, 2020

Andrei Iancu
*Director of the United States Patent and Trademark Office*